A. BARDELL.
FIRE-SHOVEL.

No. 178,708.     Patented June 13, 1876.

Witnesses.
Otto Hufeland
Robt E. Miller

Inventor.
Alfred Bardell
per
Van Santvoord & Hauff
Attorneys

UNITED STATES PATENT OFFICE.

ALFRED BARDELL, OF BROOKLYN, E. D., NEW YORK.

IMPROVEMENT IN FIRE-SHOVELS.

Specification forming part of Letters Patent No. 178,708, dated June 13, 1876; application filed May 13, 1876.

*To all whom it may concern:*

Be it known that I, ALFRED BARDELL, of the city of Brooklyn, E. D., county of Kings, and State of New York, have invented a new and useful Improvement in Fire - Shovels, which improvement is fully set forth in the following specification, reference being had to the accompanying drawing, in which—

Figure 1:
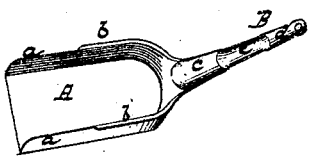
Figure 2:
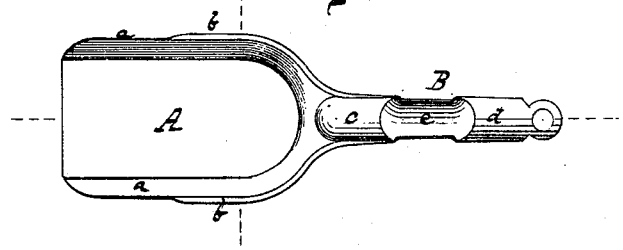
Figure 3:
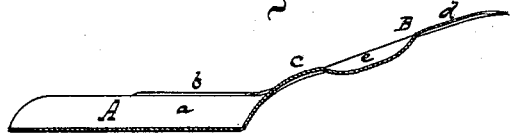
Figure 4:

Figure 1 represents a perspective view. Fig. 2 is a plan or top view. Fig. 3 is a longitudinal vertical section in the plane $x\,x$, Fig. 2. Fig. 4 is a transverse vertical section in the plane $y\,y$, Fig. 2.

Similar letters indicate corresponding parts.

This invention consists in a fire-shovel the scoop of which is provided with a smooth rim, that is strengthened by an outwardly-projecting flange. The handle is raised at its ends and provided with a depression in the middle, which is intended for the reception of the thumb of the hand that grasps said handle, thereby improving the convenience in handling the shovel. The scoop and the handle are stamped out of one piece of sheet metal, and the outwardly - projecting flange of the scoop extends partly up on the edge of the handle, so as to strengthen the connection between the scoop and the handle.

In the drawing, the letter A designates the scoop of my fire-shovel, and the letter B its handle, both parts being stamped out of sheet metal. The scoop A is provided with a smooth rim, $a$, and from the rear portion of this rim projects a flange, $b$. The object of this flange is to prevent the rim from wrinkling during the process of stamping, and also to increase the strength of the rim, so that the same is less liable to be bent inward, and that lighter material can be used for the manufacture of the article, as compared with similar shovels, the rim of which lacks the outwardly-projecting flange. The handle B is provided with raised portions $c\,d$ near its ends, and with an intermediate depressed portion, $e$. By these means the strength and stiffness of the handle is improved, and the depression $e$ affords a good hold for the thumb of the hand which grasps the handle, so that my shovel can be conveniently handled. The scoop A and the handle B are, by preference, stamped out of one and the same piece of sheet metal, and the outwardly - projecting flange $b$ extends partly up on the edges of the handle, whereby the connection between the scoop and the handle is materially strengthened.

What I claim as new, and desire to secure by Letters Patent, is—

1. A fire-shovel the handle B of which is provided with raised portions $c\,d$ and an intermediate depression, $e$, substantially as set forth.

2. A fire-shovel composed of a scoop, A, with a rim, $a$, and outwardly-projecting flange $b$, and of a handle, B, provided with raised portions $c\,d$ and an intermediate depression, $e$, the flange $b$ being made to extend partly up on the edges of the handle, substantially as shown and described.

In testimony that I claim the foregoing I have hereunto set my hand and seal this 10th day of May, A. D. 1876.

ALFRED BARDELL. [L. S.]

Witnesses:
 W. HAUFF,
 B. ALBERT.